Jan. 18, 1955 E. L. YOCUM 2,699,608
PARALLAX CORRECTOR
Filed July 17, 1953
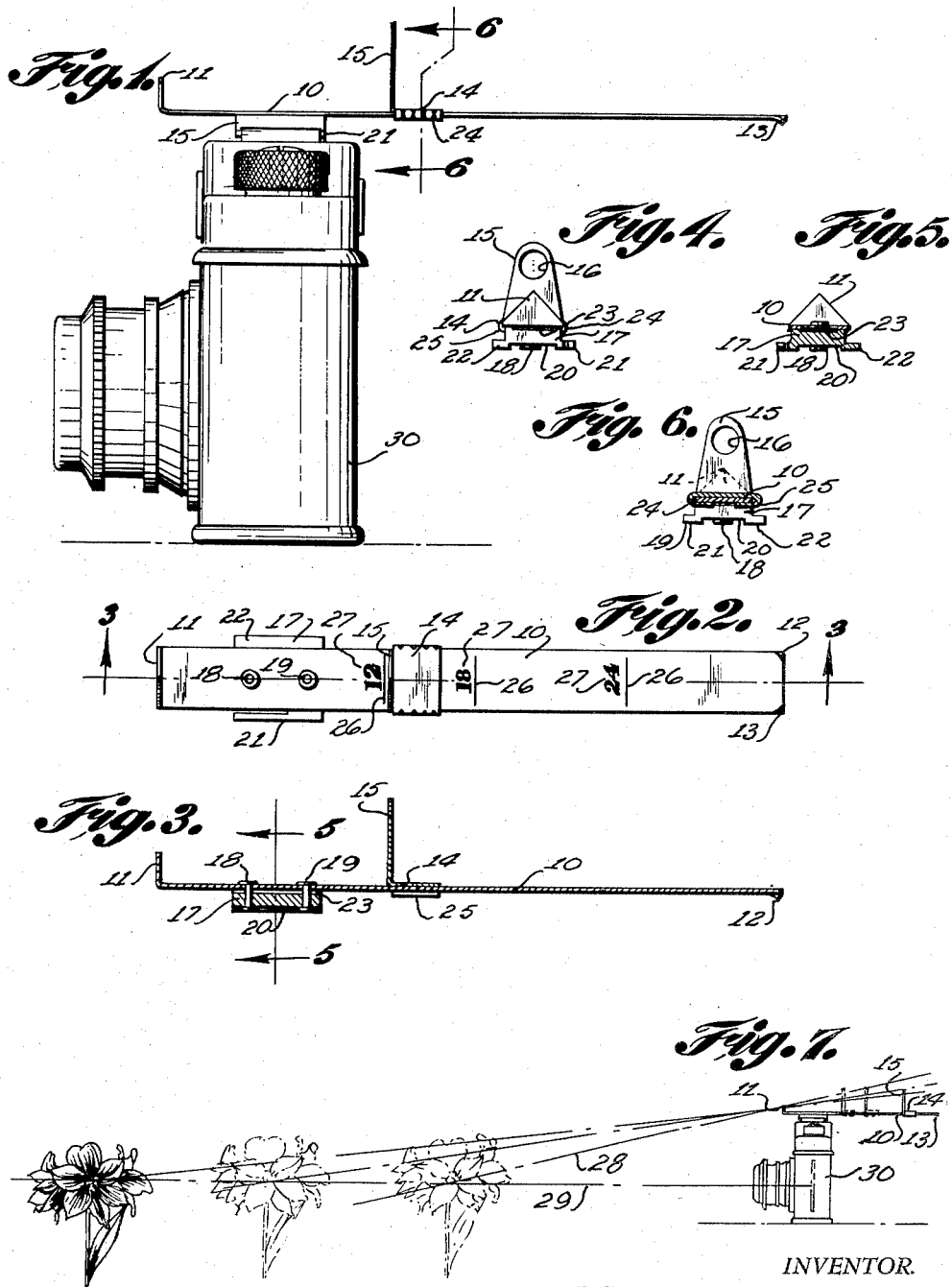
INVENTOR.
Elmer L. Yocum
BY Victor J. Evans & Co.
ATTORNEYS

United States Patent Office 2,699,608
Patented Jan. 18, 1955

2,699,608
PARALLAX CORRECTOR

Elmer L. Yocum, Milton, Pa.

Application July 17, 1953, Serial No. 368,721

2 Claims. (Cl. 33—46)

This invention relates to photography, relating particularly to view finding and focusing, and in particular an attachment adapted to be mounted on a camera and having a fixed sight and a movable sight or peep hole for aligning the camera with the axis of the lens and particularly adapted to compensate for the fact that the line of sight from the eye is offset or spaced above the axis of the lens.

With conventional cameras the picture viewing lens or line of sight from the eye of the photographer is positioned on the upper surface of the camera and this is spaced from the axis of the lens. With the line of sight parallel to the axis of the lens the actual picture viewed through the sight opening is spaced above the picture taken by the lens. With this thought in mind this invention contemplates an attachment for a camera wherein the line of sight from the viewing lens is positioned at an angle in relation to the axis of the lens so that the meeting point of the line of sight with the axis of the lens is at the picture being taken by the camera and with the line of sight of the picture finder adjustable the meeting point between the line of sight and axis of the lens may be located at different distances from the camera.

The object of this invention is, therefore, to provide means for forming an attachment adapted to be mounted on a camera wherein a picture taken by the lens of the camera corresponds with the picture observed by the view finder of the camera.

Another object of the invention is to provide a parallax corrector for a camera that is adapted to be mounted on cameras now in use without changing the structure of the camera.

A further object of the invention is to provide a parallax corrector for a camera in which the device is of a simple and economical construction.

With these and other objects and advantages in view the invention embodies an elongated bar having a point extended upwardly from one end with another point or peep hole slidably mounted on the bar and with the bar provided with means whereby it may readily be attached to a camera.

Other features and advantages of the invention will appear from the following description taken in connection with the drawing, wherein:

Figure 1 is a side elevational view showing a camera with a parallax corrector of this invention mounted thereon.

Figure 2 is a plan view of the parallax corrector.

Figure 3 is a longitudinal section through the parallax corrector taken on line 3—3 of Fig. 2.

Figure 4 is an end elevational view of the device looking toward the end on which the point is positioned.

Figure 5 is a cross section through the device taken on line 5—5 of Fig. 3.

Figure 6 is a cross section through the device taken on line 6—6 of Fig. 1 showing the sliding point or peep hole mounted on the bar of the device.

Figure 7 is a side elevational or diagrammatic view illustrating the use of the parallax corrector and showing the device mounted on a camera.

Referring now to the drawing wherein like reference characters denote corresponding parts the parallax corrector of this invention includes a bar 10 having a point 11 extended upwardly from one end and having projections 12 and 13 on the corners of the opposite end positioned to prevent accidental displacement of a slider having a base 14 and an upwardly extended plate 15, and the bar 10 is also provided with a mounting plate 17 that is secured to the bar 10 with rivets 18 and 19.

The point 11 is positioned over the central longitudinal axis of the bar and the plate 15 is provided with an opening or peep hole 16.

The mounting plate 17 is spaced from the end of the bar 10 on which the point 11 is positioned and, as illustrated in Fig. 6 the mounting plate 17 is provided with a longitudinally disposed recess 20 in the lower surface with projections or flanges 21 and 22 extended from the sides. The plate 17 is also provided with a longitudinally disposed recess 23 in the upper surface, as shown in Fig. 5.

The base 14 of the vertically disposed plate 15 is provided with flanges 24 and 25, that wrap around the edges of the bar, as shown in Fig. 6, providing means for retaining the base on the bar 10 with the base adapted to slide longitudinally of the bar.

The bar is provided with spaced graduations, as indicated by the numeral 26 and the graduations may be provided with numerals 27 to indicate the distance from the camera to a point at which the line of sight of the attachment, as indicated by the numeral 28, meets the axis 29 of the lens of the camera, such as the camera 30, shown in Fig. 7.

The mounting plate may be secured to the upper part of the camera housing by screws, bolts, or other suitable means and with the parts positioned as illustrated in Figs. 1 and 7 an operator may use the device as a view finder, setting the plate 15 substantially at the distance the camera is located from a picture or object to be photographed and by this means the lens will take the same picture viewed through the view finder.

Although it is preferred that the graduations 26 on the bar 10 be made to represent inches it will be understood that other suitable units of measure may be used.

The design of the parallax corrector shown in the drawing is for use with a "Portra" lens, and is designed to cover the entire range of all three of such lenses, from ten inches from camera to greatest distance of No. 1 lens. When using a conventional camera, it is impossible to take clear pictures when the objects being photographed are closer than three feet to the camera. The "Portra" lens developed by "Kodak" is a separate lens that when attached to the camera and used in conjunction with the lens of the conventional camera will permit objects within a closer range than three feet to be clearly photographed. As previously stated, this invention was primarily designed for use with such a lens.

It will be understood that modifications, within the scope of the appended claims, may be made in the design and arrangement of the parts without departing from the spirit of the invention.

What is claimed is:

1. A view aligning camera attachment comprising a bar having an upwardly extended section with a point on the upper end at one end thereof, a slider slidably mounted on the bar and having a plate with an opening spaced from the upper end mounted thereon, the distance between the opening in the plate and the bar being greater than the distance between the point at the end of the bar and the bar, and a mounting plate carried by the bar and spaced from the end on which the point is positioned, said bar having means thereon for preventing accidental separation of the slider from the bar.

2. A view aligning camera attachment comprising a bar having an upwardly extended section with a point on the upper end at one end thereof, a slider slidably mounted on the bar and having a plate with an opening spaced from the upper end mounted thereon, the distance between the openings in the plate and the bar being greater than the distance between the point at the end of the bar and the bar, and a mounting plate carried by the bar and spaced from the end on which the point is positioned, said bar having means thereon for preventing accidental separation of the slider from the bar, and also having graduations on the upper surface.

References Cited in the file of this patent

UNITED STATES PATENTS

| | | |
|---|---|---|
| 53,420 | Daly | Mar. 27, 1866 |
| 745,258 | Steadman | Nov. 24, 1903 |
| 1,771,903 | Soth | July 29, 1930 |

FOREIGN PATENTS

| | | |
|---|---|---|
| 6,092 | Great Britain | Mar. 24, 1894 |